(12) United States Patent
Chen et al.

(10) Patent No.: US 12,116,016 B1
(45) Date of Patent: Oct. 15, 2024

(54) DECISION-MAKING AND PLANNING INTEGRATED METHOD FOR NONCONSERVATIVE INTELLIGENT VEHICLE

(71) Applicant: TONGJI UNIVERSITY, Shanghai (CN)

(72) Inventors: Hong Chen, Shanghai (CN); Lin Zhang, Shanghai (CN); Rongjie Yu, Shanghai (CN); Qiang Meng, Shanghai (CN); Jinlong Hong, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/539,247

(22) Filed: Dec. 13, 2023

(30) Foreign Application Priority Data

Apr. 4, 2023 (CN) .......................... 202310355005.5

(51) Int. Cl.
| | |
|---|---|
| *B60W 60/00* | (2020.01) |
| *B60W 40/04* | (2006.01) |
| *B60W 50/00* | (2006.01) |
| *G06N 3/04* | (2023.01) |

(52) U.S. Cl.
CPC ...... *B60W 60/00274* (2020.02); *B60W 40/04* (2013.01); *B60W 50/0097* (2013.01); *G06N 3/04* (2013.01); *B60W 2554/4041* (2020.02); *B60W 2554/4045* (2020.02); *B60W 2556/10* (2020.02)

(58) Field of Classification Search
CPC .......... B60W 60/00274; B60W 40/04; B60W 50/0097; B60W 2554/4041; B60W 2554/4045; B60W 2556/10; G06N 3/04

USPC .......................................................... 701/25
See application file for complete search history.

(56) References Cited

U.S. PATENT DOCUMENTS

| | | | |
|---|---|---|---|
| 11,409,304 B1 * | 8/2022 | Cai | B60R 1/00 |
| 11,521,396 B1 * | 12/2022 | Jain | G06N 3/0455 |
| 11,577,722 B1 * | 2/2023 | Packer | G05D 1/0238 |
| 11,685,408 B1 * | 6/2023 | Zhao | G01C 21/3841 |
| | | | 701/25 |
| 11,816,901 B2 * | 11/2023 | Narayanan | G06N 3/044 |

(Continued)

*Primary Examiner* — Mohamed Abdo Algehaim
(74) *Attorney, Agent, or Firm* — Bochner PLLC; Andrew D. Bochner

(57) ABSTRACT

Disclosed is a decision-making and planning integrated method for a nonconservative intelligent vehicle in a complex heterogeneous environment, including the following steps: offline establishing and training a social interaction knowledge learning model; obtaining state data of the traffic participants and state data of an intelligent vehicle online in real time, and splicing the state data to obtain an environmental state; using the environmental state as an input to the trained social interaction knowledge learning model to obtain predicted trajectories of all traffic participants including the nonconservative intelligent vehicle; updating the environmental state based on the predicted trajectories; and inputting the updated environmental state to the social interaction knowledge learning model to complete trajectory decision-making and planning for the nonconservative intelligent vehicle by iteration, where a planned trajectory of the nonconservative intelligent vehicle is a splicing result of a first point of a predicted trajectory obtained by each iteration.

8 Claims, 3 Drawing Sheets

(56) References Cited

U.S. PATENT DOCUMENTS

| | | | |
|---|---|---|---|
| 2018/0124423 A1* | 5/2018 | Choi | G06V 10/82 |
| 2019/0287404 A1* | 9/2019 | Vernaza | G08G 1/0145 |
| 2019/0310651 A1* | 10/2019 | Vallespi-Gonzalez | G01C 21/1652 |
| 2019/0346844 A1* | 11/2019 | Chen | G05B 13/0265 |
| 2020/0082248 A1* | 3/2020 | Villegas | G06N 3/044 |
| 2020/0324794 A1* | 10/2020 | Ma | B60W 60/00272 |
| 2021/0082283 A1* | 3/2021 | Malla | G06V 20/58 |
| 2021/0394784 A1* | 12/2021 | Blaiotta | G06N 3/08 |
| 2022/0214457 A1* | 7/2022 | Liang | G06N 3/04 |
| 2022/0306160 A1* | 9/2022 | Girase | G01S 17/86 |
| 2022/0410938 A1* | 12/2022 | Huang | B60W 60/0027 |
| 2023/0038673 A1* | 2/2023 | Masoud | B60W 30/095 |
| 2023/0040006 A1* | 2/2023 | Weiss | B60W 60/00274 |
| 2023/0159027 A1* | 5/2023 | Pronovost | B60W 60/0027 701/26 |
| 2023/0230484 A1* | 7/2023 | Al Faruque | G06V 10/82 |
| 2024/0043020 A1* | 2/2024 | Rosman | B60W 50/06 |

* cited by examiner

DECISION-MAKING AND PLANNING INTEGRATED METHOD FOR NONCONSERVATIVE INTELLIGENT VEHICLE

CROSS REFERENCE TO RELATED APPLICATION

This patent application claims the benefit and priority of Chinese Patent Application No. 2023103550055, filed with the China National Intellectual Property Administration on Apr. 4, 2023, the disclosure of which is incorporated by reference herein in its entirety as part of the present application.

TECHNICAL FIELD

The present disclosure relates to the field of trajectory planning for intelligent vehicles, and in particular, to a decision-making and planning integrated method for a nonconservative intelligent vehicle in a complex heterogeneous environment.

BACKGROUND

With the development of intelligent vehicles and the people's yearning for a convenient and safe travel mode, excessively conservative decision-making by an existing excessively safe intelligent vehicle in a complex heterogeneous environment will result in low passage efficiency because the intelligent vehicle may be frequently intervened by pedestrians and bicycles around. Therefore, a nonconservative intelligent vehicle with driving characteristics as by a professional driver is one of means for improving the utilization rate and comfort of the intelligent vehicle.

To allow an intelligent vehicle to arrive at a destination rapidly and safely, an existing mainstream architecture is to perform action decision-making first and then trajectory planning. The action decision-making is a main factor for determining the passage efficiency of the intelligent vehicle. Since a dynamic Bayesian network has a same architecture with a decision-making process of a human driver, the dynamic Bayesian network has good expansibility and interpretability and thus has been extensively used. Moreover, the dynamic Bayesian network has good performance in lane-changing decision making of the intelligent vehicle on a road. Furthermore, a deep learning algorithm is similar to the dynamic Bayesian network. Likewise, the deep learning algorithm also faces a challenge due to numerous and varying environmental information in the complex heterogeneous environment, leading to a problem of difficult convergence or incomplete coverage of a decision-making model. As a result, it is difficult to promote the existing decision-making models in the complex heterogeneous environment. In addition, since the architecture of performing action decision-making first and then trajectory planning is used, a planned future trajectory is based on current traffic participant information, and the influence of social interaction prediction on the future trajectory is neglected. Thus, a planned trajectory may be conservative, causing the intelligent vehicle to plan an unwanted deceleration behavior and even abrupt deceleration. Consequently, the comfort and passage efficiency of the intelligent vehicle are reduced to a large extent.

A decision-making and planning integrated architecture based on model prediction has been proposed by a researcher, which is intended to avoid planning of an infeasible trajectory caused by wrong decision-making. In this way, the purpose of predicting future social prediction to improve the passage efficiency cannot be achieved. In addition, this architecture also faces the challenge due to numerous and varying environmental information in the complex heterogeneous environment.

SUMMARY

An objective of the present disclosure is to provide a decision-making and planning integrated method for a nonconservative intelligent vehicle in a complex heterogeneous environment that can adapt to the complex heterogeneous environment, deeply analyze and predict social interaction, improve the passage efficiency of the vehicle, and avoid planning of an infeasible trajectory caused by wrong decision-making.

The objective of the present disclosure can be achieved by the following technical solution.

A decision-making and planning integrated method for a nonconservative intelligent vehicle in a complex heterogeneous environment includes the following steps:

offline establishing and training a social interaction knowledge learning model, where inputs to the social interaction knowledge learning model are position, velocity, acceleration, and class information of traffic participants, and outputs of the social interaction knowledge learning model are predicted trajectories of the traffic participants;

obtaining state data of the traffic participants and state data of an intelligent vehicle online in real time, and splicing the state data to obtain an environmental state, where the environmental state includes the position, the velocity, the acceleration, and the class information of the traffic participants;

using the environmental state as an input to the trained social interaction knowledge learning model to obtain predicted trajectories of the traffic participants including the intelligent vehicle;

updating the environmental state based on the predicted trajectories; and inputting the updated environmental state to the social interaction knowledge learning model to complete trajectory decision-making and planning for the intelligent vehicle by iteration, where a planned trajectory of the nonconservative intelligent vehicle is a splicing result of a first point of a predicted trajectory obtained by each iteration.

The social interaction knowledge learning model may include an encoding part and a decoding part; the encoding part may be configured to establish a position graph, a velocity graph, an acceleration graph, and a class graph, into each of which expert experience is introduced, based on the position, the velocity, the acceleration, and the class information of the traffic participants, separately, and capture topological structure relationships and time dependence relationships from the position graph, the velocity graph, the acceleration graph, and the class graph based on four parallel spatial relationship capture networks and time dependence relationship capture networks, separately, to obtain a position hidden state, a velocity hidden state, an acceleration hidden state, and a class hidden state; and the decoding part may be configured to decode the position hidden state, the velocity hidden state, the acceleration hidden state, and the class hidden state separately, and update model parameters based on differences between the predicted trajectories and actual trajectories to obtain future trajectory prediction results of the traffic participants.

The position graph may be established by:

$$G_P = (U_P, E_P)$$

$$U_P = \{u_P^i = (x_i, y_i) | i = 1, 2, \ldots, N\}$$

$$E_P = \left\{ e_p^{ij} = OAE_P^{ij} \times \frac{1}{\|\vec{D}_{ji}\| + 1} | i, j = 1, 2, \ldots, N \right\}$$

$$OAE_P^{ij} = \begin{cases} 1 + \left| \frac{\vec{v}_i \cdot \vec{D}_{ji}}{\|\vec{v}_i\| \cdot \|\vec{D}_{ji}\|} \right|, & \left| \text{acos}\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & \text{others} \end{cases}$$

where $G_P$ represents the position graph; $U_P$ is a node of the position graph, represented by a position of a traffic participant; $E_P$ is an edge of the position graph, representing an interactive relationship under the action of a relative position; $\vec{D}_{ji}$ represents a relative position vector between a traffic participant i and a traffic participant j; $OAE_P^{ij}$ is an introduced expert experience correction coefficient for a relative position relationship; and Vi is a velocity vector of the traffic participant i, representing a direction of a center line of a field angle of the traffic participant.

The velocity graph may be established by:

$$G_V = (U_V, E_V)$$

$$U_V = \{u_V^i = (v_x^i, v_y^i) | i = 1, 2, \ldots, N\}$$

$$E_V = \left\{ e_V^{ij} = OAE_V^{ij} \times \frac{1}{\|\vec{D}_{ji}\| + 1} | i, j = 1, 2, \ldots, N \right\}$$

$$OAE_V^{ij} = \left[ 2 - \left| \left( \frac{\vec{v}_i \cdot \vec{v}_j}{|\vec{v}_i| \cdot |\vec{v}_j|} \right) \right| \right] \times (\|\vec{v}_i - \vec{v}_j\|)$$

where $G_V$ represents the velocity graph; $U_V$ is a node of the velocity graph, represented by a velocity of a traffic participant; $E_V$ is an edge of the velocity graph, representing an interactive relationship under the action of a relative velocity; $OAE_V^{ij}$ is an introduced expert experience correction coefficient for a relative velocity relationship; $\vec{D}_{ji}$ represents the relative position vector between the traffic participant i and the traffic participant j; and $\vec{v}_i$ and $\vec{v}_j$ represent velocity vectors of the traffic participants i and j, respectively.

The acceleration graph may be established by:

$$G_A = (U_A, E_A)$$

$$U_A = \{u_A^i = (a_x^i, a_y^i) | i = 1, 2, \ldots, N\}$$

$$E_A = \left\{ e_A^{ij} = OAE_A^{ij} \times \frac{1}{\|\vec{D}_{ji}\| + 1} | i, j = 1, 2, \ldots, N \right\}$$

$$OAE_A^{ij} = \left[ 2 - \left| \left( \frac{\vec{a}_i \cdot \vec{a}_j}{|\vec{a}_i| \cdot |\vec{a}_j|} \right) \right| \right] \times (\|\vec{a}_i - \vec{a}_j\|)$$

where $G_A$ represents the acceleration graph; $U_A$ is a node of the acceleration graph, represented by an acceleration of a traffic participant; $E_A$ is an edge of the acceleration graph, representing an interactive relationship under the action of a relative acceleration; $OAE_A^{ij}$ is an introduced expert experience correction coefficient for a relative acceleration relationship; $\vec{a}_i$ is an acceleration vector of the traffic participant i; $\vec{a}_j$ is an acceleration vector of the traffic participant j; and $\vec{D}_{ji}$ represents the relative position vector between the traffic participant i and the traffic participant j.

The class graph may be established by:

$$G_C = (U_C, E_C)$$

$$U_C = \{u_C^i = (C_c^i) | i = 1, 2, \ldots, N; c \in [1, 2, 3]\}$$

$$E_C = \left\{ e_C^{ij} = OAE_C^{ij} \times \frac{1}{\|\vec{D}_{ji}\| + 1} | i, j = 1, 2, \ldots, N \right\}$$

$$OAE_C^{ij} = \begin{cases} 1 + \left| \frac{\vec{v}_i \cdot \vec{D}_{ji}}{\|\vec{v}_i\| \cdot \|\vec{D}_{ji}\|} \right|, & \left| \text{acos}\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & \text{others} \end{cases}$$

where $G_C$ represents the class graph; $U_C$ is a node of the class graph, representing a traffic participant risk coefficient; $c \in [1,2,3]$ corresponds to a pedestrian, a bicycle, or a vehicle, respectively; $E_C$ is an edge of the class graph, representing a risk degree; $OAE_C^{ij}$ represents an expert experience correction coefficient related to a transportation agent class; $\vec{v}_i$ represents the velocity vector of the traffic participant i; $\vec{v}_j$ represents a velocity vector of the traffic participant j; and $\vec{D}_{ji}$ represents the relative position vector between the traffic participant i and the traffic participant j.

The spatial relationship capture network may be a graph convolutional neural network.

The time dependence relationship capture network may be a temporal convolutional network, a Long Short-Term Memory neural network, a recurrent neural network, or a gated neural network.

The updating the environmental state based on the predicted trajectories may specifically include: eliminating first points in historical trajectories of the traffic participants, and splicing the historical trajectories without the first points with first points of the predicted trajectories to update the environmental state.

The state data of the traffic participants may come from a vehicle-mounted sensor mounted on the nonconservative intelligent vehicle.

Compared with the prior art, the present disclosure has the following beneficial effects:

(1) For the social interaction knowledge learning part, an encoding-decoding architecture based on a multi-layer directed graph convolutional neutral network is used in the present disclosure, where the encoding part is composed of the position graph, the velocity graph, the acceleration graph, and the class graph and enables the social interaction knowledge learning model to learn choosing interference characteristics from a plurality of pieces of information, choosing interference neighborhoods from a plurality of interactive traffic participants, and considering different social attributes of the traffic participants. For the decoding part, errors between actual future trajectories and predicted trajectories of traffic participants are used to evaluate the social interaction learning effect of the model in the present disclosure and to correct coefficients to be determined in the social interaction knowledge learning model. This is a key for predicting social interaction and a foundation for considering the influence of social interaction prediction on a future trajectory. Based on the social interaction knowledge learning, the present disclosure permits deep analysis of social interaction in the decision-making and planning integrated method and can meet the challenge of numerous and varying environmental information in the complex heterogeneous environment.

(2) For an online rolling planning part, a rolling planning architecture is used in the present disclosure to predict future trajectories of all participants and use the future trajectory of the intelligent vehicle as the planned trajectory, where one round of trajectory planning is realized by multiple trajectory planning iterations. That is, only a trajectory point of next step may be obtained by each step of trajectory planning. After a new trajectory point is obtained, the first point input to the model at the present step will be abandoned and spliced to the current input to the model to form a new model input, thereby allowing for next step of planning. In such an iterative manner, the influence of social interaction prediction on a future trajectory can be taken into account to increase the passage rate of the intelligent vehicle and avoid wrong decision-making. This is a key for the decision-making and planning integrated method for a nonconservative intelligent vehicle.

(3) The social interaction knowledge learning model of the present disclosure is established and trained online and invoked during online iterative trajectory planning. Thus, the online calculation quantity is reduced and the response velocity is increased.

BRIEF DESCRIPTION OF THE DRAWINGS

In FIG. 1, 1—Offline social interaction knowledge learning, 2—Online rolling planning, 3—Encoding part, 4—Decoding part, 5—Offline dataset, 6—Position, velocity, 7—Position, acceleration, 8—Position, acceleration, class, 9—Position graph, 10—Velocity graph, 11—Acceleration graph, 12—Class graph, 13—First layer, Graph convolution and temporal convolution, 14—Second layer, Graph convolution and temporal convolution, 15—Third layer, Graph convolution and temporal convolution, 16—Fourth layer, Graph convolution and temporal convolution, 17—Position hidden state, 18—Velocity hidden state, 19—Acceleration hidden state, 20—Class hidden state, 21—Actual trajectory, 22—Decoder, 23—Pedestrian trajectory 24—Bicycle trajectory, 25—Vehicle trajectory, 26—Update network parameters based on differences between predicted trajectories and actual trajectories, 27—Social interaction knowledge learning model, 28—Vehicle-mounted sensor output, 29—Intelligent state data, 30—Surrounding state, 31—Intelligent vehicle state, 32—Environmental information, 33—Environmental state, 34—Social interaction knowledge learning model, 35—Update the environmental state, 36—Eliminate and update the state, 37—Environmental state, 38—Iterative prediction, 39—Predicted trajectory, 40—First points of predicted trajectories of all participants, 41—First point of trajectory prediction of one step for intelligent vehicle, and 42—Splice to obtain a planned trajectory.

DETAILED DESCRIPTION OF THE EMBODIMENTS

The present disclosure will be described in detail below with reference to the drawings and specific embodiments. The embodiments are implemented on the premise of the technical solutions of the present disclosure. The following presents detailed implementations and specific operation processes. The protection scope of the present disclosure, however, is not limited to the following embodiments.

Figure 1:
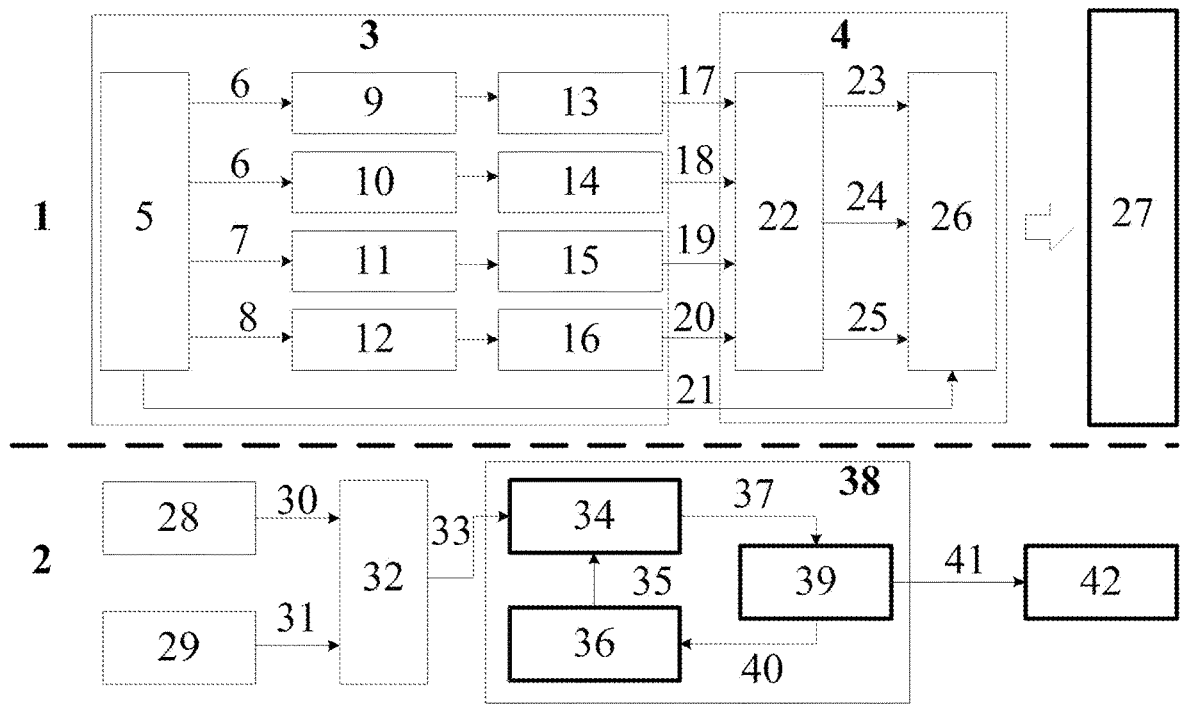
FIG. 1 is a schematic flowchart of a method according to the present disclosure.

The present embodiment provides a decision-making and planning integrated method for a nonconservative intelligent vehicle in a complex heterogeneous environment, as shown in FIG. 1, including the following steps.

1) A social interaction knowledge learning model is established offline and trained.

As shown in the upper half part of FIG. 1, an encoding-decoding architecture based on a multi-layer directed graph convolutional neutral network is used for the offline social interaction knowledge learning model. An encoding part is configured to establish a position graph, a velocity graph, an acceleration graph, and a class graph, into each of which expert experience is introduced, based on the position, the velocity, the acceleration, and the class information of the traffic participants, separately, and capture topological structure relationships and time dependence relationships from the position graph, the velocity graph, the acceleration graph, and the class graph based on four parallel spatial relationship capture networks and time dependence relationship capture networks, separately, to obtain a position hidden state, a velocity hidden state, an acceleration hidden state, and a class hidden state. A decoding part is configured to decode the position hidden state, the velocity hidden state, the acceleration hidden state, and the class hidden state separately, and evaluate a social interaction learning effect of the model and update model parameters based on differences between predicted trajectories and actual trajectories to obtain future trajectory prediction results of the traffic participants.

Specifically, the position graph is established by:

$$G_P = (U_P, E_P)$$

$$U_P = \{u_P^i = (x_i, y_i) | i = 1, 2, \ldots, N\}$$

$$E_P = \left\{ e_P^{ij} = OAE_P^{ij} \times \frac{1}{\|\vec{D}_{ji}\| + 1} | i, j = 1, 2, \ldots, N \right\}$$

$$OAE_P^{ij} = \begin{cases} 1 + \left|\frac{\vec{v}_i \cdot \vec{D}_{ji}}{\|\vec{v}_i\| \cdot \|\vec{D}_{ji}\|}\right|, & \left|\mathrm{acos}\left(\frac{\vec{v}_i \cdot \vec{D}_{ji}}{\|\vec{v}_i\| \cdot \|\vec{D}_{ji}\|}\right)\right| \leq \frac{\pi}{2} \\ 0, & \text{others} \end{cases}$$

where $G_P$ represents the position graph; $U_P$ is a node of the position graph, represented by a position of a traffic participant; $E_P$ is an edge of the position graph, representing an interactive relationship under the action of a relative position; $\vec{D}_{ji}$ represents a relative position vector between a traffic participant i and a traffic participant j; $OAE_P^{ij}$ is an introduced expert experience correction coefficient for a relative position relationship; and $\vec{v}_i$ is a velocity vector of the traffic participant i, representing a direction of a center line of a field angle of the traffic participant.

Obstacles beyond the angle of view of an agent may not affect the future trajectories of the traffic participants. On this basis, it is assumed that a viewing angle range of a traffic participant is within 180°, and from the avoidance experience of traffic participants, the closer the relative position between the traffic participants, the more obvious the interactive adversarial relationship between the traffic participants. Therefore, a velocity of the traffic participant is taken as the center line of the field angle, and when an included angle between the velocity of the traffic participant and the relative position of traffic participants is less than or equal to ±90°, the prediction on the trajectory of the traffic participant will be affected to an extent which depends on the magnitudes of the velocity of the traffic participant and the relative position. Thus, the expert experience correction coefficient for the relative position relationship is determined.

The velocity graph is established by:

$$G_V = (U_V, E_V)$$

$$U_V = \{u_V^i = (v_x^i, v_y^i) | i = 1, 2, \ldots, N\}$$

$$E_V = \left\{ e_V^{ij} = OAE_V^{ij} \times \frac{1}{\|\vec{D}_{ji}\| + 1} | i, j = 1, 2, \ldots, N \right\}$$

$$OAE_V^{ij} = \left[ 2 - \left| \left( \frac{\vec{v}_i \cdot \vec{v}_j}{|\vec{v}_i| \cdot |\vec{v}_j|} \right) \right| \right] \times (\|\vec{v}_i - \vec{v}_j\|)$$

where $G_V$ represents the velocity graph; $U_V$ is a node of the velocity graph, represented by a velocity of a traffic participant; $E_V$ is an edge of the velocity graph, representing an interactive relationship under the action of a relative velocity; and $OAE_V^{ij}$ is an introduced expert experience correction coefficient for a relative velocity relationship.

Within the angle of view, the interactive relationship between traffic participants is related to a relative velocity and a relative acceleration therebetween, in additional to a relative position. For example, although two traffic participants are close to each other, a conflict between them is not intense since the directions of the relative velocity and the relative acceleration are parallel. Conversely, if two traffic participants are far away from each other, the interaction between them exhibits an intense conflict since the directions of the relative velocity and the relative acceleration are perpendicular. It can thus be seen that the influence of interaction between traffic participants gradually increases as the relative velocity and the relative acceleration of them increase and the included angle between them increase to a right angle. Thus, the expert experience correction coefficient for the relative velocity relationship described above and the expert experience correction coefficient for the relative acceleration relationship described below can be determined.

The acceleration graph is established by:

$$G_A = (U_A, E_A)$$

$$U_A = \{u_A^i = (a_x^i, a_y^i) | i = 1, 2, \ldots, N\}$$

$$E_A = \left\{ e_A^{ij} = OAE_A^{ij} \times \frac{1}{\|\vec{D}_{ji}\| + 1} | i, j = 1, 2, \ldots, N \right\}$$

$$OAE_A^{ij} = \left[ 2 - \left| \left( \frac{\vec{a}_i \cdot \vec{a}_j}{|\vec{a}_i| \cdot |\vec{a}_j|} \right) \right| \right] \times (\|\vec{a}_i - \vec{a}_j\|)$$

where $G_A$ represents the acceleration graph; $U_A$ is a node of the acceleration graph, represented by an acceleration of a traffic participant; $E_A$ is an edge of the acceleration graph, representing an interactive relationship under the action of a relative acceleration; $OAE_A^{ij}$ is an introduced expert experience correction coefficient for a relative acceleration relationship; $\vec{a}_i$ is an acceleration vector of a traffic participant i; and $\vec{a}_j$ is an acceleration vector of a traffic participant j.

In the complex heterogeneous environment, a road is shared by pedestrians, bicycles, and vehicles together. Due to inconsistent sizes, motion capabilities, and constituent materials of traffic participants, different agents may have different rick coefficients. This is the root cause for different social attributes of the traffic participants.

In the present disclosure, the class graph into which the expert experience is introduced may use a traffic participant risk coefficient as a node and a risk degree as an edge, and an expert experience correction coefficient related to a transportation agent class may be introduced into the edge. The traffic participant risk coefficient depends on the traffic participant classes, and the nodes of the pedestrian, the bicycle, and the vehicle are defined as 1, 2, and 3. In the case of a same traffic participant ahead, the smaller the relative distance, the higher the risk degree. Similarly, the risk degree when the included angle of the velocity vector is a right angle is higher than that when the included angle of the velocity vector is a parallel angle. Therefore, the risk degree is related to the relative distance between traffic participants and the included angle of the velocity vector.

Thus, the class graph is established by:

$$G_C = (U_C, E_C)$$

$$U_C = \{u_C^i = (C_c^i) | i = 1, 2, \ldots, N; c \in [1, 2, 3]\}$$

$$E_C = \left\{ e_C^{ij} = OAE_C^{ij} \times \frac{1}{\|\vec{D}_{ji}\| + 1} | i, j = 1, 2, \ldots, N \right\}$$

$$OAE_C^{ij} = \begin{cases} 1 + \left| \frac{\vec{v}_i \cdot \vec{D}_{ji}}{\|\vec{v}_i\| \cdot \|\vec{D}_{ji}\|} \right|, & \left| \mathrm{acos}\left( \frac{\vec{v}_i \cdot \vec{D}_{ji}}{\|\vec{v}_i\| \cdot \|\vec{D}_{ji}\|} \right) \right| \leq \frac{\pi}{2} \\ 0, & \text{others} \end{cases}$$

where $G_C$ represents the class graph; $U_C$ is a node of the class graph, representing a traffic participant risk coefficient; $c \in [1,2,3]$ corresponds to a pedestrian, a bicycle, or a vehicle, respectively; $E_C$ is an edge of the class graph, representing a risk degree; and $OAE_C^{ij}$ represents an expert experience correction coefficient related to a transportation agent class.

In consideration of the excellent topological structure learning capability of the graph convolutional neutral network, the spatial relationship capture network is a graph convolutional neural network, and other networks are not recommended.

For the time dependence relationship capture network, a temporal convolutional network or other sequential neural networks (such as a Long Short-Term Memory neural network, a recurrent neural network, or a gated neural network) may be used.

Figure 2:
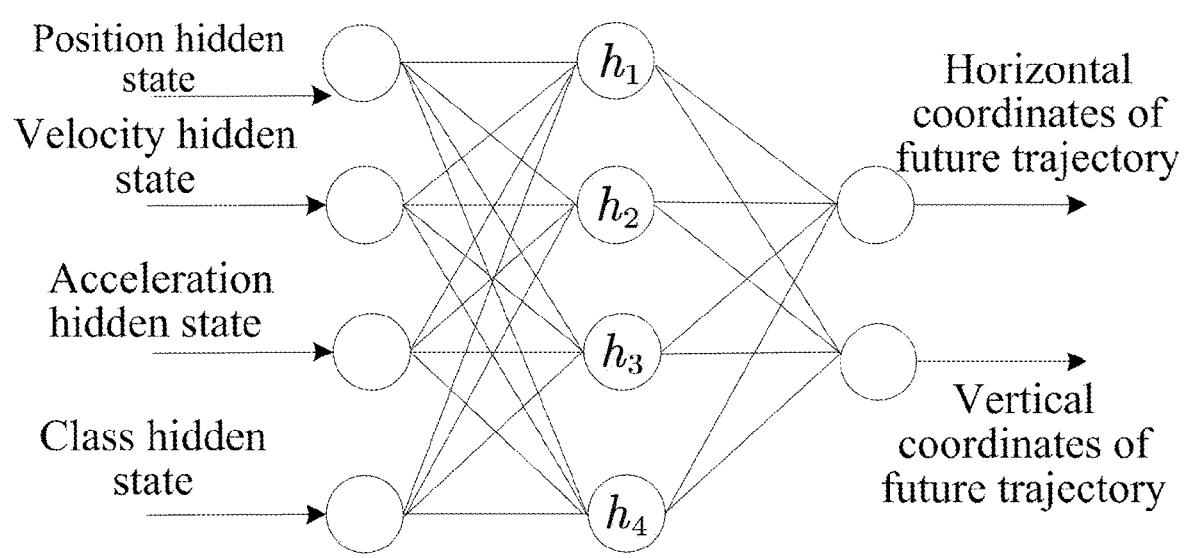
FIG. 2 is a schematic diagram of a decoder in one embodiment.

For the decoding part, a convolutional neutral network is used in the present embodiment. It needs to be noted that errors between actual future trajectories and predicted trajectories of traffic participants are used herein to evaluate the social interaction learning effect of the model and to correct coefficients to be determined in the social interaction knowledge learning model. As shown in FIG. 2, inputs to the convolutional neutral network are hidden states output by the encoding part, including a position hidden state, a velocity hidden state, an acceleration hidden state, and a class hidden state. $h_i$ represents a hidden layer. A number of units of the hidden layers may be increased according to the capability of a computing platform. The hidden layer includes a weighting matrix coefficient and an activation function coefficient obtained by learning. An output of the convolutional neural network is a future trajectory of a traffic participant, including horizontal coordinates and vertical coordinates.

2) State data of the traffic participants and state data of an intelligent vehicle are obtained online in real time, and spliced to obtain an environmental state.

In the present embodiment, the state data of the traffic participant around is obtained by a vehicle-mounted sensor (such as a radar, a laser radar, and a camera) of the intelligent vehicle.

Unlike the inputs to the offline social interaction knowledge learning model, the state of the intelligent vehicle needs to be added as one of the model inputs. The environmental state includes the position, the velocity, the acceleration, and the class information of the traffic participants.

3) the environmental state is used as an input to the trained social interaction knowledge learning model to obtain predicted trajectories of the traffic participants including the intelligent vehicle.

Figure 3:
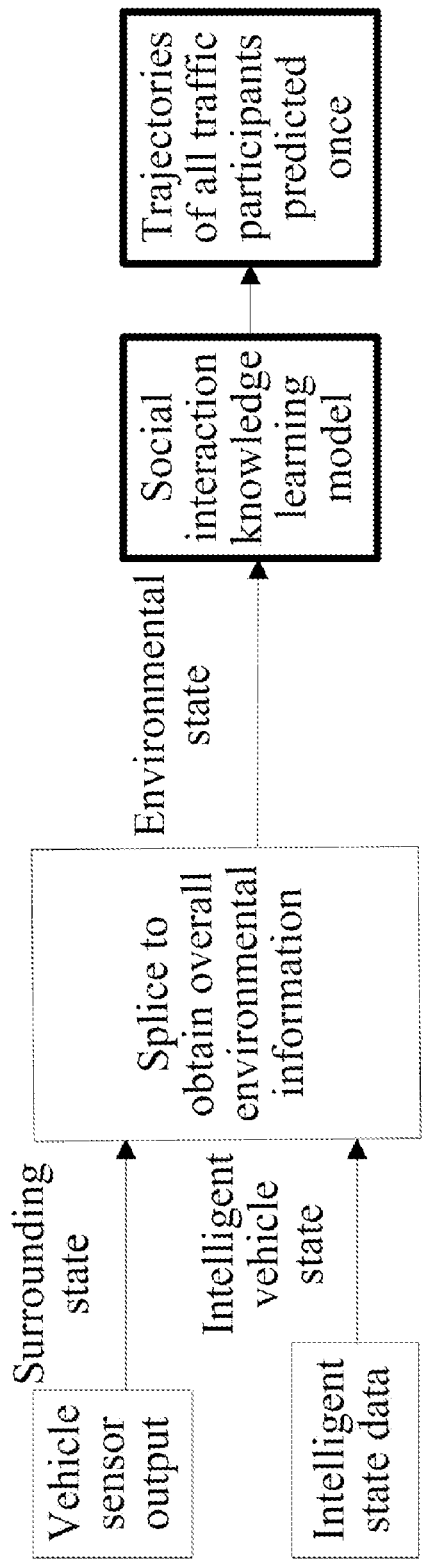
FIG. 3 is a flowchart of first trajectory prediction.

The flow of first trajectory predicting is as shown in FIG. 3, the state of the intelligent vehicle is spliced with the state data of the traffic participant around to obtain overall environmental information as the input to the social interaction knowledge learning model, thereby obtaining the trajectories of the traffic participants by one round of prediction.

4) The environmental state is updated based on future trajectories of the traffic participants predicted at the previous step.

Figure 4:
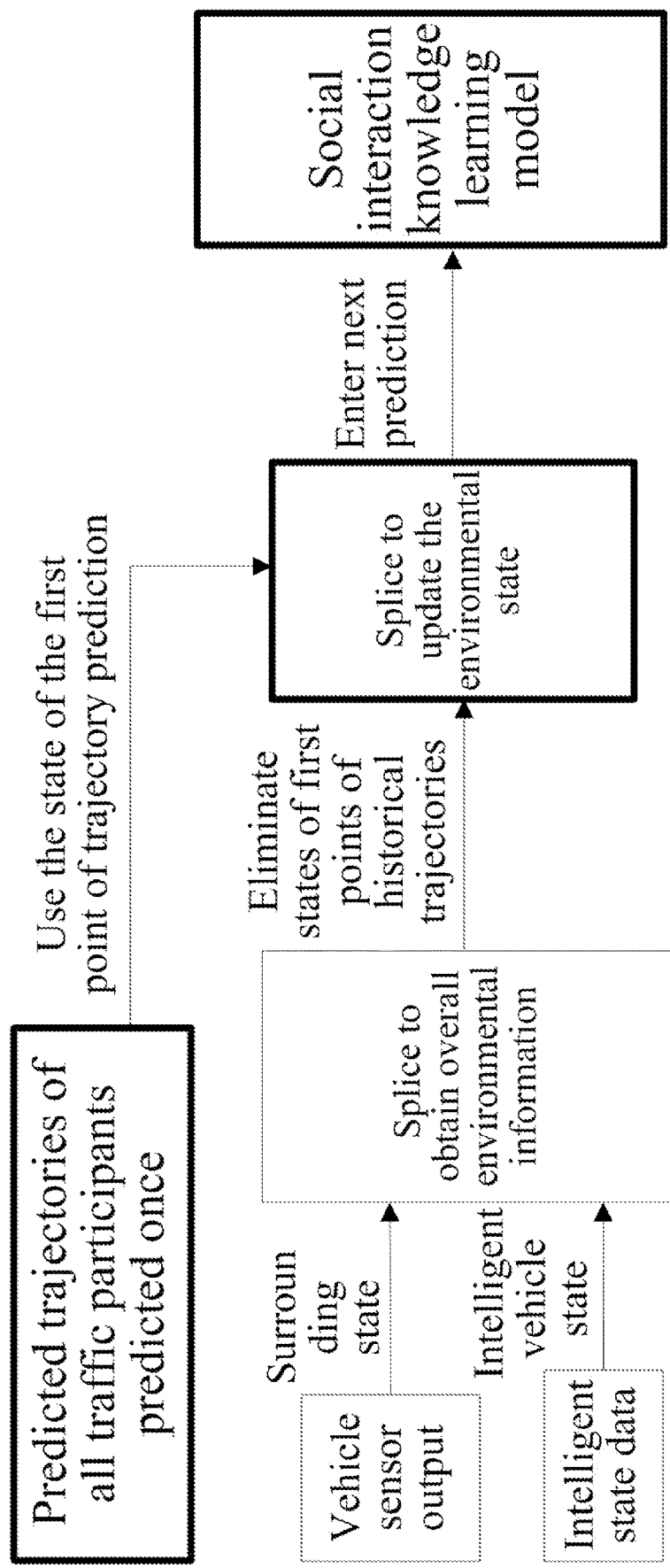
FIG. 4 is a flowchart of environmental state updating.

It needs to be noted that as shown in FIG. 4, in consideration of the influence of iteration of a prediction error, only the first point of a predicted trajectory is used as the new state of a traffic participant and the first point of the predicted trajectory is spliced to the input (i.e., a historical trajectory relative to the current prediction) used in the current prediction. To remain input dimensions of the model unchanged, the first point of the input used in the current prediction is abandoned to form a new input to the social interaction knowledge learning model. This is a foundation for predicting the influence of future social interaction on a planned trajectory. That is, the method of updating the environmental state is as follows: for the current step, first points in historical trajectories of the traffic participants are eliminated, and the historical trajectories without the first points are spliced with first points of the predicted trajectories to update the environmental state.

5) The updated environmental state is input to the social interaction knowledge learning model to complete trajectory decision-making and planning for the intelligent vehicle by iteration (the iteration is completed until the time of iterative prediction is equal to the time of a trajectory needing to be planned), where a planned trajectory of the intelligent vehicle is a splicing result of a first point of a predicted trajectory obtained by each iteration.

For an online rolling planning part, the trained offline social interaction knowledge learning model is employed to plan a trajectory of the intelligent vehicle. It needs to be noted that one round of trajectory planning is realized by multiple trajectory planning iterations. That is, only a trajectory point of next step may be obtained by each step of trajectory planning, and the obtained trajectory point is used as a model input in next planning. Then, trajectory points obtained by splicing the first point of the predicted trajectory obtained by each iteration are used as the planned trajectory of the intelligent vehicle. Thus, the planning process is completed.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can arrive at based on the prior art through logical analysis, reasoning, or finite experiments according to the concept of the present invention shall fall within the protection scope defined by the appended claims.

What is claimed is:

1. A decision-making and planning integrated method for a nonconservative intelligent vehicle in a complex heterogeneous environment, comprising the following steps:

offline establishing and training a social interaction knowledge learning model, wherein inputs to the social interaction knowledge learning model are position, velocity, acceleration, and class information of traffic participants, and outputs of the social interaction knowledge learning model are predicted trajectories of the traffic participants;

obtaining state data of the traffic participants and state data of an intelligent vehicle online in real time, and splicing the state data to obtain an environmental state, wherein the environmental state comprises the position, the velocity, the acceleration, and the class information of the traffic participants;

using the environmental state as an input to the trained social interaction knowledge learning model to obtain predicted trajectories of the traffic participants comprising the nonconservative intelligent vehicle;

updating the environmental state based on the predicted trajectories; and inputting the updated environmental state to the social interaction knowledge learning model to complete trajectory decision-making and planning for the nonconservative intelligent vehicle by iteration, wherein a planned trajectory of the nonconservative intelligent vehicle is a splicing result of a first point of a predicted trajectory obtained by each iteration, controlling the nonconservative intelligent vehicle to drive based on the planned trajectory of the nonconservative intelligent vehicle;

wherein the social interaction knowledge learning model comprises an encoding part and a decoding part: the encoding part is configured to establish a position graph, a velocity graph, an acceleration graph, and a class graph, into each of which expert experience is introduced, based on the position, the velocity, the acceleration, and the class information of the traffic participants, separately, and capture topological structure relationships and time dependence relationships from the position graph, the velocity graph, the acceleration graph, and the class graph based on four parallel spatial relationship capture networks and time dependence relationship capture networks, separately, to obtain a position hidden state, a velocity hidden state, an acceleration hidden state, and a class hidden state; and the decoding part is configured to decode the position hidden state, the velocity hidden state, the acceleration hidden state, and the class hidden state separately, and update model parameters based on differences between the predicted trajectories and actual trajectories to obtain future trajectory prediction results of the traffic participants;

wherein the position graph is established by:

$$G_P = (U_P, E_P)$$

$$U_P = \{u_P^i = (x_i, y_i) | i = 1, 2, \ldots, N\}$$

$$E_P = \left\{e_P^{ij} = OAE_P^{ij} \times \frac{1}{\|\vec{D}_{ji}\| + 1} | i, j = 1, 2, \ldots, N\right\}$$

$$OAE_P^{ij} = \begin{cases} 1 + \left|\frac{\vec{v}_i \cdot \vec{D}_{ji}}{\|\vec{v}_i\| \cdot \|\vec{D}_{ji}\|}\right|, & \left|\text{acos}\left(\frac{\vec{v}_i \cdot \vec{D}_{ji}}{\|\vec{v}_i\| \cdot \|\vec{D}_{ji}\|}\right)\right| \leq \frac{\pi}{2} \\ 0, & \text{others} \end{cases}$$

wherein $G_P$ represents the position graph; $U_P$ is a node of the position graph, represented by a position of a traffic participant; $E_P$ is an edge of the position graph, representing an interactive relationship under the action of a relative position; $\vec{D}_{ji}$ represents a relative position vector between a traffic participant i and a traffic participant j; $OAE_P^{ij}$ is an introduced expert experience correction coefficient for a relative position relationship; and $\vec{v}_i$ is a velocity vector of the traffic participant i, representing a direction of a center line of a field angle of the traffic participant.

2. The decision-making and planning integrated method for a nonconservative intelligent vehicle in a complex heterogeneous environment according to claim 1, wherein the velocity graph is established by:

$$G_V = (U_V, E_V)$$

$$U_V = \{u_V^i = (v_x^i, v_y^i) | i = 1, 2, \ldots, N\}$$

$$E_V = \left\{e_V^{ij} = OAE_V^{ij} \times \frac{1}{\|\vec{D}_{ji}\| + 1} | i, j = 1, 2, \ldots, N\right\}$$

$$OAE_V^{ij} = \left[2 - \left|\left(\frac{\vec{v}_i \cdot \vec{v}_j}{|\vec{v}_i| \cdot |\vec{v}_j|}\right)\right|\right] \times (\|\vec{v}_i - \vec{v}_j\|)$$

wherein $G_V$ represents the velocity graph; $U_V$ is a node of the velocity graph, represented by a velocity of a traffic participant; $E_V$ is an edge of the velocity graph, representing an interactive relationship under the action of a relative velocity; $OAE_V^{ij}$ is an introduced expert experience correction coefficient for a relative velocity relationship; $\vec{D}_{ij}$ represents the relative position vector between the traffic participant i and the traffic participant j; and $\vec{v}_i$ and $\vec{v}_j$ represent velocity vectors of the traffic participants i and j, respectively.

3. The decision-making and planning integrated method for a nonconservative intelligent vehicle in a complex heterogeneous environment according to claim 1, wherein the acceleration graph is established by:

$$G_A = (U_A, E_A)$$

$$U_A = \{u_A^i = (a_x^i, a_y^i) | i = 1, 2, \ldots, N\}$$

$$E_A = \left\{e_A^{ij} = OAE_A^{ij} \times \frac{1}{\|\vec{D}_{ji}\| + 1} | i, j = 1, 2, \ldots, N\right\}$$

$$OAE_A^{ij} = \left[2 - \left|\left(\frac{\vec{a}_i \cdot \vec{a}_j}{|\vec{a}_i| \cdot |\vec{a}_j|}\right)\right|\right] \times (\|\vec{a}_i - \vec{a}_j\|)$$

wherein $G_A$ represents the acceleration graph; $U_A$ is a node of the acceleration graph, represented by an acceleration of a traffic participant; $E_A$ is an edge of the acceleration graph, representing an interactive relationship under the action of a relative acceleration; $OAE_A^{ij}$ is an introduced expert experience correction coefficient for a relative acceleration relationship; $\underline{a}_i$ is an acceleration vector of the traffic participant i; $\underline{a}_j$ is an acceleration vector of the traffic participant j; and $\vec{D}_{ji}$ represents the relative position vector between the traffic participant i and the traffic participant j.

4. The decision-making and planning integrated method for a nonconservative intelligent vehicle in a complex heterogeneous environment according to claim 1, wherein the class graph is established by:

$$G_C = (U_C, E_C)$$

$$U_C = \{u_C^i = (C_c^i) | i = 1, 2, \ldots, N; c \in [1, 2, 3]\}$$

$$E_C = \left\{e_C^{ij} = OAE_C^{ij} \times \frac{1}{\|\vec{D}_{ji}\| + 1} | i, j = 1, 2, \ldots, N\right\}$$

$$OAE_C^{ij} = \begin{cases} 1 + \left|\frac{\vec{v}_i \cdot \vec{D}_{ji}}{\|\vec{v}_i\| \cdot \|\vec{D}_{ji}\|}\right|, & \left|\text{acos}\left(\frac{\vec{v}_i \cdot \vec{D}_{ji}}{\|\vec{v}_i\| \cdot \|\vec{D}_{ji}\|}\right)\right| \leq \frac{\pi}{2} \\ 0, & \text{others} \end{cases}$$

wherein $G_C$ represents the class graph; $U_C$ is a node of the class graph, representing a traffic participant risk coefficient; $c \in [1,2,3]$ corresponds to a pedestrian, a bicycle, or a vehicle, respectively; $E_C$ is an edge of the class graph, representing a risk degree; $OAE_C^{ij}$ represents an expert experience correction coefficient related to a transportation agent class; i represents the velocity vector of the traffic participant i; $\vec{v}_j$ represents a velocity vector of the traffic participant j; and $\vec{D}_{ji}$ represents the relative position vector between the traffic participant i and the traffic participant j.

5. The decision-making and planning integrated method for a nonconservative intelligent vehicle in a complex heterogeneous environment according to claim 1, wherein the spatial relationship capture network is a graph convolutional neural network.

6. The decision-making and planning integrated method for a nonconservative intelligent vehicle in a complex heterogeneous environment according to claim 1, wherein the time dependence relationship capture network is a temporal convolutional network, a Long Short-Term Memory neural network, a recurrent neural network, or a gated neural network.

7. The decision-making and planning integrated method for a nonconservative intelligent vehicle in a complex heterogeneous environment according to claim 1, wherein the updating the environmental state based on the predicted trajectories specifically comprises: eliminating first points in historical trajectories of the traffic participants, and splicing the historical trajectories without the first points with first points of the predicted trajectories to update the environmental state.

8. The decision-making and planning integrated method for a nonconservative intelligent vehicle in a complex heterogeneous environment according to claim 1, wherein the state data of the traffic participants comes from a vehicle-mounted sensor mounted on the nonconservative intelligent vehicle.

\* \* \* \* \*